United States Patent
Moreno et al.

(10) Patent No.: US 9,109,357 B2
(45) Date of Patent: Aug. 18, 2015

(54) MODULAR ISOLATION SYSTEMS

(71) Applicant: Worksafe Technologies, Valencia, CA (US)

(72) Inventors: Gil A. Moreno, San Clemente, CA (US); Don A. Hubbard, Valencia, CA (US)

(73) Assignee: WORKSAFE TECHNOLOGIES, Valencia, CA (US)

( * ) Notice: Subject to any disclaimer, the term of this patent is extended or adjusted under 35 U.S.C. 154(b) by 0 days.

(21) Appl. No.: 14/380,899

(22) PCT Filed: Mar. 1, 2013

(86) PCT No.: PCT/US2013/028621
§ 371 (c)(1),
(2) Date: Sep. 29, 2014

(87) PCT Pub. No.: WO2013/130975
PCT Pub. Date: Sep. 6, 2013

(65) Prior Publication Data
US 2015/0101269 A1     Apr. 16, 2015

Related U.S. Application Data

(60) Provisional application No. 61/605,669, filed on Mar. 1, 2012.

(51) Int. Cl.
| | |
|---|---|
| *E04H 9/02* | (2006.01) |
| *E04B 1/36* | (2006.01) |
| *E01D 19/04* | (2006.01) |
| *F16F 15/02* | (2006.01) |
| *E04B 1/98* | (2006.01) |
| *E04F 15/024* | (2006.01) |

(52) U.S. Cl.
CPC . *E04B 1/36* (2013.01); *E01D 19/04* (2013.01); *E04B 1/98* (2013.01); *E04F 15/02405* (2013.01); *E04F 15/02452* (2013.01); *E04F 15/02458* (2013.01); *E04H 9/023* (2013.01); *F16F 15/02* (2013.01); *E04H 9/024* (2013.01); *E04H 9/028* (2013.01)

(58) Field of Classification Search
CPC ........... E04H 9/02; E04H 9/024; E04H 9/027; E04H 9/028; F16F 15/02; F16F 15/021; F16F 7/08
USPC ........................ 52/167.3, 167.5, 167.4, 167.1
See application file for complete search history.

(56) References Cited

U.S. PATENT DOCUMENTS

| | | | | |
|---|---|---|---|---|
| 3,606,704 A | * | 9/1971 | Denton | 52/167.8 |
| 4,517,778 A | * | 5/1985 | Nicolai | 52/167.5 |
| 4,805,359 A | * | 2/1989 | Miyake et al. | 52/167.6 |

(Continued)

FOREIGN PATENT DOCUMENTS

| | | | | |
|---|---|---|---|---|
| JP | H03062247 A | | 3/1991 | |
| JP | 06158912 A | * | 6/1994 | ............... E04H 9/02 |
| JP | 06280421 A | * | 10/1994 | ............... E04H 9/02 |

(Continued)

*Primary Examiner* — Phi A
(74) *Attorney, Agent, or Firm* — Stout, Uxa & Buyan, LLP; Carlos A. Fisher

(57) ABSTRACT

A modular base isolation system suitable for constructing isolation floors and platforms using the same elements, and capable of scaling up or down to suit the payload mass. These systems are low profile and permit placement of such systems un paces having restricted headroom. Also kits and methods or making and using such modular isolation systems.

14 Claims, 8 Drawing Sheets

(56) References Cited

U.S. PATENT DOCUMENTS

| | | | |
|---|---|---|---|
| 4,941,640 A * | 7/1990 | Nakamura et al. | 248/562 |
| 5,081,806 A * | 1/1992 | Pommelet | 52/167.5 |
| 5,706,249 A * | 1/1998 | Cushman | 367/1 |
| 5,862,635 A * | 1/1999 | Linse et al. | 52/126.6 |
| 6,052,955 A | 4/2000 | Haider | |
| 8,156,696 B2 * | 4/2012 | Hubbard et al. | 52/167.5 |
| 2007/0220815 A1 | 9/2007 | Kemeny | |
| 2007/0261323 A1 | 11/2007 | Hubbard et al. | |
| 2008/0120927 A1 * | 5/2008 | Tsai | 52/167.4 |
| 2010/0032876 A1 * | 2/2010 | Hiley et al. | 267/140.5 |

FOREIGN PATENT DOCUMENTS

| | | | | |
|---|---|---|---|---|
| JP | 06288066 A * | 10/1994 | | E04F 15/024 |
| JP | 06323033 A * | 11/1994 | | E04H 9/02 |
| JP | 2003206648 A | 7/2003 | | |
| JP | 2008019941 A | 1/2008 | | |
| JP | 2008069965 A | 3/2008 | | |
| JP | 2010230057 A | 10/2010 | | |
| WO | WO 2006038313 A1 * | 4/2006 | | E04H 9/02 |

* cited by examiner

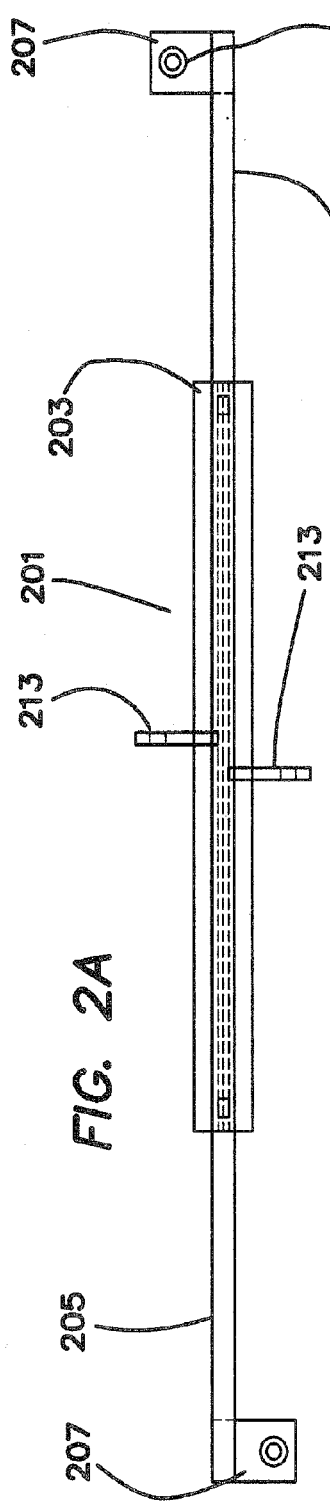
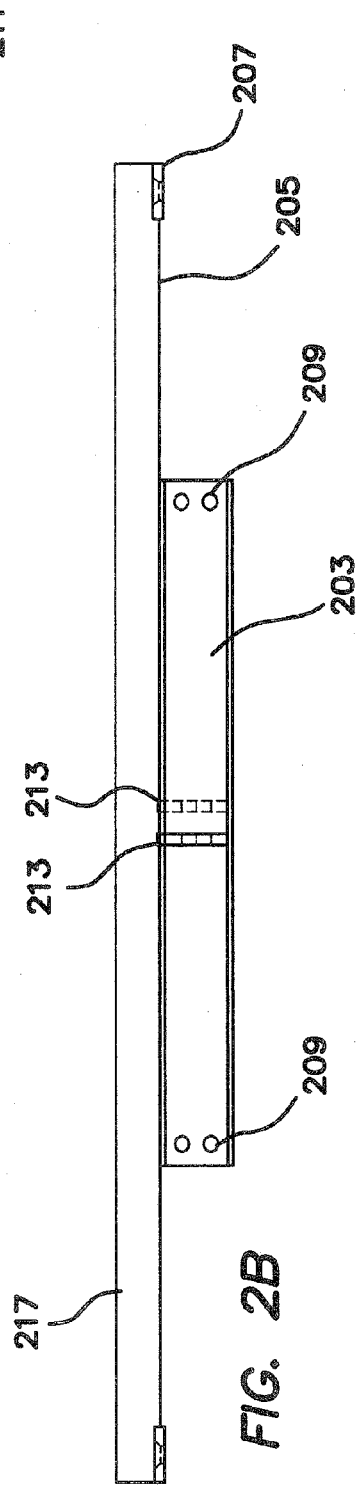
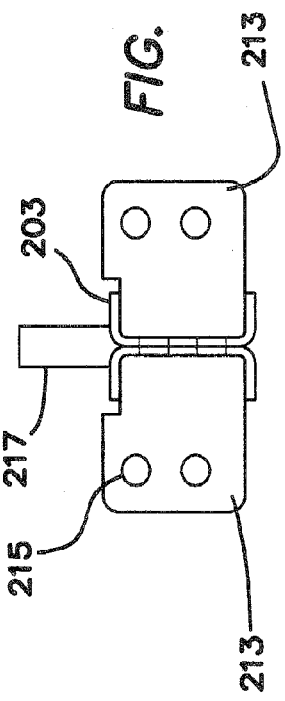

MODULAR ISOLATION SYSTEMS

RELATED APPLICATION

This application claims priority to U.S. Provisional Patent Application No. 61/605,669, which was filed Mar. 1, 2012 and is hereby incorporated by reference herein in its entirety.

BACKGROUND OF THE INVENTION

Earthquakes occur at cracks in the earth's crust in which shifting tectonic plates build stresses within the crust that literally tear the surface of the earth when they are released. Generally speaking, the world's most active fault zones are known. The most famous of these fault zones is the so-called Pacific "ring of fire" circumscribing the Pacific Ocean and including most of the west coast of North, Central and South America, Japan, Taiwan, Indonesia, and New Zealand. Other fault zones occur in, for example, the eastern Mediterranean (e.g., Turkey, Armenia and the Caucasus region of Russia), and in South Asia (for example, Pakistan, Malaysia and Thailand).

Although minor earthquakes are common, with thousands of smaller earthquakes occurring daily, larger magnitude seismic events can cause personal injury, death and property and environmental damage, particularly in heavily populated areas.

Two approaches have been traditionally utilized to prevent or limit damage or injury to objects or payloads due to seismic events. In the first approach, used particularly with structures themselves, the objects or payload articles are made strong enough to withstand the largest anticipated earthquake. However, in addition to the relative unpredictability of damage caused by tremors of high magnitude and long duration and of the directionality of shaking, use of this method alone can be quite expensive and is not necessarily suitable for payloads to be housed within a structure. Particularly for delicate, sensitive or easily damaged payload, this approach alone is not especially useful.

In the second approach, the objects are isolated from the vibration such that the objects fail to experience the full force and acceleration of the seismic shock waves. Various methods have been proposed for accomplishing isolation or energy dissipation of a structure or object from seismic tremors, and these methods may depend in some measure on the nature of the object to be isolated.

Thus, buildings and other structures may be isolated using, for example, passive systems, active systems, or hybrid systems. Such systems may include the use of one or more of a torsional beam device, a lead extrusion device, a flexural beam device, a flexural plate device, and a lead-rubber device; these generally involve the use of specialized connectors that deform and yield during an earthquake. The deformation is focused in specialized devices and damage to other parts of the structure are minimized; however the deformed devices often must be repaired or replaced after the seismic event, and are therefore largely suitable for only one use.

Active control systems require an energy source and computerized control actuators to operate braces or dampers located throughout the structure to be protected. Such active systems are complex, and require service or routine maintenance.

For objects other than buildings, bridges and other structures, isolation platforms or flooring systems may be preferable to such active or deformable devices. Thus, for protection of delicate or sensitive equipment such as manufacturing or processing equipment, laboratory equipment, computer servers and other hardware, optical equipment and the like an isolation system may provide a simpler, effective, and less maintenance-intensive alternative. Isolation systems are designed to decouple the objects to be protected (hereinafter the "payload") from damage due to the seismic ground motion.

Isolators have a variety of designs. Thus, such systems have generally comprised a combination of some or all of the following features: a sliding plate, a support frame slidably mounted on the plate with low friction elements interposed therebetween, a plurality of springs and/or axial guides disposed horizontally between the support frame and the plate, a floor mounted on the support frame through vertically disposed springs, a number of dampers disposed vertically between the support frame and the floor, and/or a latch means to secure the vertical springs during normal use.

Certain disadvantages to such pre-existing systems include the fact that it is difficult to establish the minimum acceleration at which the latch means is released; it is difficult to reset the latch means after the floor has been released; it may be difficult to restore the floor to its original position after it has moved in the horizontal direction; the dissipative or damping force must be recalibrated to each load; there is a danger of rocking on the vertical springs; and since the transverse rigidity of the vertical springs cannot be ignored with regard to the horizontal springs, the establishment of the horizontal springs and an estimate of their effectiveness, are made difficult.

Ishida et al., U.S. Pat. No. 4,371,143 have proposed a sliding-type isolation floor that comprises length adjustment means for presetting the minimum acceleration required to initiate the isolation effects of the flooring in part by adjusting the length of the springs.

Yamada et al., U.S. Pat. No. 4,917,211 discloses a sliding type seismic isolator comprising a friction device having an upper friction plate and a lower friction plate, the friction plates having a characteristic of Coulomb friction, and horizontally placed springs which reduce a relative displacement and a residual displacement to under a desired value. The upper friction plate comprises a material impregnated with oil, while a lower friction plate comprises a hard chromium or nickel plate.

Stahl (U.S. Pat. No. 4,801,122) discloses a seismic isolator for protecting e.g., art objects, instruments, cases or projecting housing comprising a base plate connected to a floor and a frame. A moving pivoted lever is connected to a spring in the frame and to the base plate. The object is placed on top of the frame. Movement of the foundation and base plate relative to the frame and object causes compression of the lever and extension of the spring, which then exerts a restoring force through a cable anchored to the base plate; initial resistance to inertia is caused due to friction between the base plate and the frame.

Kondo et al., U.S. Pat. No. 4,662,133 describes a floor system for seismic isolation of objects placed thereupon comprising a floor disposed above a foundation, a plurality of support members for supporting the floor in a manner that permits the movement of the floor relative to the foundation in a horizontal direction, and a number of restoring devices comprising springs disposed between the foundation and the floor member. The restoring members comprise two pair of slidable members, each pair of slidable members being movable towards and away from each other wherein each pair of slidable members is disposed at right angles from each other in the horizontal plane.

Stiles et al., U.S. Pat. No. 6,324,795 disclose a seismic isolation system between a floor and a foundation comprising a plurality of ball and socket joints disposed between a floor and a plurality of foundation pads or piers. In this isolation device, the bearing comprises a movable joint attached to a hardened elastomeric material (or a spring); the elastic material is attached on an upper surface of the ball and socket joint and thus sandwiched between the floor and the ball and socket joint; the bearing thus tilts in relation to the floor in response to vertical movement. The floor is therefore able to adjust to buckling pressure due to distortion of the ground beneath the foundation piers. However, the device disclosed is not designed to move horizontally in an acceleration-resisting manner.

Fujimoto, U.S. Pat. No. 5,816,559 discloses a seismic isolation device quite similar to that of Kondo, as well as various other devices including one in which a rolling ball is disposed within the tip of a strut projecting downward from the floor in a manner similar to that of a ball point pen.

Bakker, U.S. Pat. No. 2,014,643, is drawn to a balance block for buildings comprising opposed inner concave surfaces with a bearing ball positioned between the surfaces to support the weight of a building superstructure.

Kemeny, U.S. Pat. No. 5,599,106 discloses ball-in-cone bearings. Kemeny, U.S. Pat. No. 7,784,225 discloses seismic isolation platforms containing rolling ball isolation bearings. Hubbard et al., U.S. Patent Publication 2007/0261323, filed on Mar. 30, 2007 discloses a method and raised access flooring structure for isolation of a payload placed thereupon. Isolation bearings are disclosed in U.S. patent application Ser. No. 13/041,160 filed on Mar. 4, 2011, and Moreno et al., International Patent Application No. PCT/US11/27269, filed on Mar. 4, 2011.

Chen, U.S. Pat. No. 5,791,096 discloses a raised floor system.

Denton, U.S. Pat. No. 3,606,704 discloses an elevated floor structure suitable for missile launching installations with vertically compressible spring units to accommodate vertical displacements of the subfloor.

Naka, U.S. Pat. No. 4,922,670 is drawn to a raised double flooring structure which is resistant to deformation under load. The floor employs columnar leg members that contain a pivot mounting near the floor surface, which permits the floor to disperse a load in response to a side load.

All patents, patent applications and other publications cited in this patent application are hereby individually incorporated by reference in their entirety as part of this disclosure, regardless whether any specific citation is expressly indicated as incorporated by reference or not.

SUMMARY OF THE INVENTION

The present invention is directed to a seismic isolation system comprising modular isolation flooring and based platform components for a being in the prevention of personal injury, equipment operating inefficiencies, and/or property damage due to displacement of industrial structures, heavy structures, or valuable, expensive, and/or delicate objects and equipment "including, for example, computer equipment such as servers and hard drive arrays" during a seismic tremor or other vibration eliciting event.

In a particularly useful aspect, the invention it is made to be transportable, either in a partially pre-assembled state, or as a plurality of unit components, whereby the components of the isolation system can be easily and quickly constructed from the unit components or pre-assembled structures comprising such unit components.

The modular isolation system of the present invention may be useful for providing seismic cushioning and can be tailored to a myriad of different operating environments. In a useful aspect, the structures built from the modular isolation components may comprise, without limitation, seismic flooring elements, or isolation base platform elements. In a particularly preferred embodiment, the invention does not comprise a raised floor structure, but rather has a low profile permitting the resulting seismic isolation structures to be substantially level with, or slightly above, the existing flooring surrounding structure.

The equipment supported by this system may comprise, without limitation, industrial manufacturing, processing, or packaging equipment; assembly line components; computer components such as mainframe computers, servers and hard drive arrays, computer components of robotic or semi-robotic equipment; electrical equipment such as dynamos and the like; laboratory and hospital equipment; hazardous chemical storage cabinets (thus preventing possible injury, explosion, fire, and the like); art works (such as, without limitation, sculptures and paintings); machinery; people; and the like. Collectively, the materials, objects and structures to be protected against damage or injury by the instant seismic isolation system will be referred to herein as the "payload".

In this embodiment, the low profile of the modular isolation system permits it to be placed within a room, building, or other structure having a relatively low ceiling. For example, computer equipment, including servers and hard drive arrays, our increasingly being placed within structures such as cargo containers that can be easily transported from location to location using, for example, a forklift or other transport device. Such structures are typically placed outside the larger building or edifice and connected thereto using data cables, electrical cables, utility cables, and the like. Such structures generally have a relatively low ceiling; most cargo containers, for example, have an inside height ranging from about 7'5" to about 7'10". The dimensions of such structures thus do not generally permit the use of an isolation system comprising a raised floor. Indeed, in most structures wiring and data cables, as well as auxiliary lines, are provided to the isolated equipment from above, rather than below.

An additional advantage to the low profile modular isolation system provided by the present invention involves the fact that payload items for which seismic isolation is desired must be loaded onto (and off of) the isolation platform or floor. When such items are heavy, it is difficult or impossible to lift them onto a raised floor or platform without mechanical assistance, and a ramp is often necessary. However, particularly within a confined container such as a cargo container or similarly sized structure there is little or no room for ramps permitting the loading of, for example, computer servers hard drive arrays and other similar equipment. Furthermore, in various locations governmental regulations require such ramps to have a maximum slope sufficiently shallow to permit disabled persons to easily access the top of the floor or platform in a wheelchair. The necessary length of such a ramp often eliminates the possibility of using a ramp within a confined environment such as a cargo container or similarly sized structure.

Thus, in a preferred embodiment described in more detail herein, the present invention provides a seismic isolation system that may be constructed at floor level or at a level only slightly above floor level, thus permitting shorter shallow ramps to be used when necessary. The modular isolation system of the present invention may be constructed so that its top surface is substantially level with the floor or foundation surrounding it. In such a case, the floor foundation may be partly excavated to create a support for the modular isolation system at a level below that of the top surface of the floor or foundation. In this way, the top surface of the modular isolation system may be slightly above, or substantially coplanar with, the top surface of the floor or foundation, thereby permitting the loading and unloading of payload without the use of ramps.

A modular isolation system, whether of low or high profile, has additional advantages; these include the fact that isolation systems can be tailored for any of a vast variety of environments. Additionally, a variety of sizes of modular isolation system components may be provided to suit a variety of payload masses and construct isolation systems of the necessary calculated strength in view of the payload mass and the anticipated maximum seismic tremor which the system is made to withstand effectively.

In a particularly preferred embodiment, a modular isolation system comprises at least two major elements; an isolation bearing, and framing elements. The isolation bearing comprises an upper and lower bearing half, with each bearing half comprising at least one centrally located recess on a top or bottom surface. In one preferred embodiment, each bearing half is identical to the other.

For example the seismic isolation bearing may comprise, for example, a ¾ inch stainless steel plate bent in such a way as to form a curved or conical surface, or a combination of such surfaces. The surface is very preferably concentrically symmetrical on its downward-facing load-bearing surface. The load-bearing surface as a whole is preferably firmly joined (e.g., welded) to the bearing casing so as to be approximately level with the floor and the top of the isolation system. The total depth of the curve (from the center of the bearing surface to the edge thereof) is also very preferably less than one half the diameter of the rigid spherical ball to be used in the bearing. For example, the rigid spherical ball may be 3.5 inches in diameter; in such case the depth of the curve of the downward-facing load-bearing surface is preferably less than 1.75 inches.

In a preferred embodiment, a circumferential ring comprising a bent steel plate material is joined (e.g., welded) around the circular edge of the load bearing surface as part of the bearing case. Also, preferably the circumferential ring is structured to project vertically slightly beyond the edge of the load-bearing surface. The bottom of each bearing half comprises a substantially horizontally aligned plate welded to the circumferential ring to complete a bearing casing within which the load bearing plate in mounted facing upwards from the open end of the casing.

Each bearing half is arranged so that, when viewed from a top or a bottom surface, a plurality of joining means are arranged around the bearing half. In a preferred embodiment, joining means are arranged at 0°, 90°, 180°, 270°, and 360°, with reference to the generally circular recess area. However, those of ordinary skill in the art will recognize that the joining means may be arranged in any suitable fashion, for example at 45°, 135°, 225°, and 315°, around the circumference of the generally circular recessed area. Additionally, there may be more or fewer positions at which joining means are arranged around the circumference of the bearing recessed area.

Joining means may comprise, for example, and without limitation, one or more threaded holes bored into a surface of the bearing casing material, for example the bottom or perimeter surfaces of the bearing casing; one or more tabs or "ears" welded or bolted to the bearing casing perimeter or circumference or pins or projections formed, molded, or welded to the bearing casing, and similar joining means apparent to the person of ordinary skill in the art. The joining means permit the assembly of bearing halves together, linked by the framing elements, and are designed to permit the assembly of modular isolation systems quickly and with a minimum of effort.

The framing elements preferably comprise structural joining features that are used in connection with the joining means contained in the bearing halves. For example, the tabs or ears of the bearing permit framing elements, also containing holes or voids, to be bolted to the bearings. Similarly, threaded holes bored into the bearing material may, for example, be joined to framing elements by screws introduced through one or more holes in the framing elements and each tightened within the threaded hole of the bearing; thereby joining the bearing to the framing element. Pins or projections formed on the bearing may also be introduced through holes in the framing elements and, if the pin or projection is threaded, the bearing half and framing element tighten together using a nut or other fastening device. Otherwise the pin or projection may comprise one or more holes permitting the bearing half to be joined to framing elements, and then more firmly fastened using a pin or other fastening means.

When joined to the bearing halves the framing elements thus comprise a strong frame. By "frame" is meant to include the horizontally extending framing elements as well as the connector fittings which link framing elements together or which link the framing elements to a bearing half.

Framing elements may comprise beams or girders of different sizes or lengths compared to each other. For example, the girder elements, which are used to directly join bearing halves may be longer and more sturdily built than the interior framing elements, or joists. For example, the girder elements may comprise an I-beam girder. The size of the girder and joist components is preferably scaled to correspond to the payload mass as well as the greatest magnitude seismic event anticipated to occur at the site at with the flooring is to be installed.

The frame, when joined to the bearing halves, is fabricated to have a high degree of integral strength, and to be resistant to bending or breaking under load. Frame elements are preferably made of metal; for example iron or steel. Alternative or additional materials may include, carbon fiber composites, fiberglass, wood, concrete, thermopolymers and thermopolymeric composites and the like. In a preferred embodiment of the present invention, the frame comprises a network of rigid, interlinked elongate frame elements. Interior joists may be somewhat smaller and/or shorter than the girder elements comprising the perimeter of the frame. In a preferred embodiment, the girders and/or joists of the frame are made of structural members that are able to be connected together in many ways, so that the isolation system of the present invention may be tailored to fit the required space and accommodate varying sizes and weights of payload to be isolated. I-beam segments and joist elements are generally at least partly metallic, and may comprise iron, aluminum, titanium, carbon, tin, copper and/or various metal alloys such as steel.

The frame may be constructed using frame elements arranged in any manner (usually in a reinforcing polygonal arrangement) permitted by the joining means giving the frame sufficient structural support to adequately support the objects to be placed on it and to resist buckling during a seismic event. Since most locations into which the present system is installed are likely to be rectangular, the frame elements may commonly be arranged in a generally quadrilateral manner. However, other arrangements are possible including frame members arranged in triangular fashion, either in planar or tetrahedral fashion, or in other geometrical shapes that lend the frame its strength.

The geometry of the arrangement of the joining elements on the bearing halves will dictate the possible footprint arrangements of the isolation bearing system comprised of the modular isolation system components of this aspect of the invention. Additionally, bearings having a different geometry of joining elements may be used in a single system to provide, for example, in isolation system having a footprint shape comprising a combination of acute, obtuse, straight, and/or right angles.

The framing elements may comprise a plurality of beam elements; preferably, though not necessarily invariably, the girder elements are all of substantially identical height and width and the joist elements are all of substantially identical height and width. The girder elements are adapted to be joined to the joining means of the bearing halves, for example, by one or more holes contained in the framing elements at positions proximal to an end of the framing element. In certain embodiments, the girder may contain one or more additional means of joining the girder element to the bearing half. For example, in a preferred embodiment, a strip of structural steel (for example having a thickness of about 1/8 inch) may be welded to the girder element, preferably along a bottom edge of the girder element; the end of the strip element contains a tab with one or more holes, permitting the strip to be bolted to a corresponding hole on the surface of the bearing casing opposite the recessed surface of the bearing half. Thus, in this configuration the girder element is joined to each bearing half in two places; the girder element is bolted to the tab or ears projecting from the perimeter or circumference of the bearing half case, and the strip element welded or otherwise joined to and part of the girder element is bolted via its tab or ears to the surface of the bearing half casing that opposes the load bearing recess.

In certain embodiments the isolation system constructed from the modular elements described herein will comprise an upper and lower frame assembly, with each such frame assembly comprising opposing upper or lower bearing halves linked by girder elements, and with joist elements linking the girder elements and/or each other. However, in other embodiments, the completed isolation system will comprise only an upper frame assembly comprising a plurality of upper bearing halves linked by frame elements. In such cases each lower bearing half may be directly bolted, cemented or otherwise joined to the foundation in a position vertically aligned with and having a recessed bearing surface directly opposing the recessed bearing surface of an upper bearing of the upper frame assembly. In such arrangements the lower bearing half may comprise leveling means (such as leveling screws) projecting downward from its lower bearing case surface.

In a particularly useful aspect, the invention is made to be transportable in a disassembled or partially pre-assembled state to the site; where the floor may be easily and quickly constructed from modular components. In addition to being more convenient, rapid and easy to install the flooring system, the modular design of the modular isolation system ensures more consistent and uniform quality control of the final installed product from site to site.

In a preferred embodiment the present invention thus provides modular isolation systems to attenuate or reduce the amount of vibrational energy or acceleration experienced by payloads. By "reducing" the vibration, vibrational energy, acceleration or displacement experienced by a payload is meant that such reduction is relative to that vibration, vibrational energy, acceleration or displacement experienced by an unisolated payload. Such modular isolation systems may be scaled to accommodate relatively light or heavy payloads. For example, and without limitation system comprised of a set of light duty modular isolation system components may be applicable for payload masses comprising research laboratory equipment, artwork, smaller computer systems and the like, generally having a mass of less than about 200 pounds per square foot. Systems comprising larger, more heavy duty modular isolation system components may be used to construct isolation platforms, floors and the like for payloads comprising industrial equipment, computer server "farms", large hard drive arrays, winemaking and beer-making equipment and casks, electric utility equipment, petroleum refinery equipment and nuclear reactor equipment, and the like. By "heavy duty" means that the invention is designed to support and protect a payload having a mass of greater than about 200 pounds per square foot, or greater than about 300 pounds per square foot, or greater than about 400 pounds per square foot, or greater than about 500 pounds per square foot.

By "foundation" is meant a base or subfloor upon or within which the bottom portion, for example, the bottom bearing halves, of the isolation system of the present invention rests and which is suitably strong enough to firmly support both the modular isolation system and the payload. Although not necessarily always or even commonly the case, in one preferred embodiment the foundation upon which the isolation system is supported is positioned lower than the plane of the surrounding floor or base, such that a support plate or panel upon which the payload is placed is at substantially the same level or plane as the surrounding floor or base. In certain embodiments the foundation comprises or is comprised within a recess, excavation, or trench having a level lower than that of, and parallel to, the plane of surrounding floor or base.

In the modular isolation system of the present invention, the top half (upper bearing half and its frame, plus the payload) of the system is supported on the foundation (e.g., concrete slab, subfloor, or pad) by a plurality of linked seismic isolation bearings, each such bearing comprising a cavity defined by opposing recessed upper and lower bearing surfaces separated by and containing at least one rigid spherical ball. The weight of the payload on the seismic flooring system is borne by these bearings, which comprise at least one curved, conical, or mixture of curved and conical surface, each such bearing comprising at least one ball. Preferably the bearing is a ball-in-cone bearing or comprises a bearing surface comprising different cross-sectional shapes. The specific way in which the system is adapted to support the payload is subject to any of a number of variations, all such variations being encompassed within the present invention.

The rigid ball(s) to be used in the isolation bearing cavity is preferably a rigid, uncoated hardened steel ball bearing, although rubber or elastomer-coated balls, synthetic balls and the like may be exclusively utilized, for example to provide a measure of dampening, in less preferred embodiments. Additionally, a combination of uncoated, low friction balls may be used in combination with a number of coated, higher friction rigid balls, with the latter ball type acting as a damper to absorb energy by friction and the mix of coated and rigid balls tailored to the specific payload mass and situation. The ball may comprise stainless steel, or any hard metal, metal alloy, or (in the case of damping balls), hardened polymeric material that is able to support a weight of at least about 1000 lb, or at least 2000 lb, or at 3000 lb, 4000 lb, without substantial deformation, or any deformation.

In particularly preferred embodiments the cross-sectional outline of the bearing surface cavities comprise a composite shape containing at least one linear region. In other embodiments the cross-sectional outline of the bearing surface cavities comprises a composite shape containing at least one curved region. In the most preferred embodiments the cross-sectional outline of the bearing surface cavities comprises a composite shape containing at least one linear region and at least one curved region.

Very preferably, the opposed bearing surfaces of each bearing are substantially identical in cross section. The same slope on the top and bottom load-bearing surface ensures that the portion of the load-bearing surface above and below the ball is always parallel, thus preventing sliding of the ball (instead of rolling) during a seismic event.

In an optional addition, in certain embodiments the modular isolation system of the present invention comprises a plate, such as a sheet of steel plating comprising a plurality of pre-drilled holes, which is structured to be placed on top of and joined (e.g., bolted) to the upper frame assembly to function as a platform or flooring component upon which the payload may be placed. Particularly in heavy-duty versions of the modular isolation system, such as when the isolation system is structured and assembled to be capable of being driven upon, such as when forklifts or other wheeled vehicles load or remove payload components from the isolation system, the plate may comprise a coating, such as a elastomeric coating or a concrete coating.

Although as reduced to practice the invention may comprise additional, different, or fewer elements than the description of the preferred embodiments provided herein, the preferred embodiment provides an illustration of the principle of the present invention. Moreover, the elements of the modular isolation system are structured to be capable of being packaged into kits or modular units for assembly into unit segments of the desired isolation system. Such kits may be packaged to comprise a plurality of isolation bearing halves and a corresponding number of framing elements comprising girder elements, joist elements and (optionally) bolts, nuts, screws and/or brackets (or similar arrangements of fasteners) for construction of one unit of the isolation system before shipment to the installation site.

Although the invention of the present application is exemplified and otherwise described in detail within and below for purposes of clarity of understanding, it will be obvious that certain modifications to the explicit descriptions may be practiced within the scope of the appended claims. Additionally, features illustrated herein as being present in a particular embodiment are intended, in aspects of the present invention, to be combinable with features described or not, in a manner not otherwise illustrated in this patent application or present in that particular embodiment. All publications and patent documents cited herein are hereby incorporated by reference in their entirety for all purposes to the same extent as if each were so individually denoted.

BRIEF DESCRIPTION OF THE DRAWINGS

FIG. 2A is a top view of a girder element assembly of an embodiment of the present invention.

FIG. 2B is a side view of the girder element of FIG. 2A.

DETAILED DESCRIPTION OF EXEMPLARY EMBODIMENTS

The present invention is directed to modular isolation systems for shielding equipment, instruments, electronics, dangerous materials, and the like from the full force of seismic vibrations. In particular, the present invention is directed to modular systems which permit the design, installation, and assembly of isolation platforms, flooring, and the like having a variety of footprints. The invention is particularly directed to isolation systems having a low profile so that auxiliary lines, such as wiring, cabling, and conduit serving the payload of the isolation systems may be extended from the ceiling of the room or structure containing the isolation system, rather than the floor.

Thus, the present isolation systems are particularly useful for installation of, for example, isolation flooring in a structure having low overhead. For example, common containers, such as cargo containers, typically have restricted headroom ranging from about 7'5" to about 7'10" or so. Since such containers, or structures having similar restricted headroom, are unable to accommodate a raised flooring isolation system, all auxiliary lines such as electricity, data cables, cooling lines, and utility lines are typically brought along the ceiling of the container or structure to feed the components contained in the structure or container. Isolation systems, therefore, must have a low profile permitting a full range of motion with very limited space under the platform flooring for such auxiliary cables etc.

Additionally, the modular design of the isolation system of the present invention is useful not only in small structures or containers commonly used to house computer data servers, hard drive arrays, and the like, but is also useful in general for fees and facility with which isolation platforms and flooring systems may be constructed. This modular design permits the design of isolation bearings and framing elements tailored to a particular payload mass to be packaged, transported and assembled as a kit, wherein each kit correspondence to an assembled isolation system of particular unit dimensions; additional units may be assembled from additional kits, thus providing an isolation system tailored to the space and payload for which seismic isolation is required.

The present invention is also directed to methods for making a variety of unique isolation floors or platforms having a footprint fitting the space in which they are intended to be used, comprising the use of uniform modular components.

EXAMPLES

Figure 1A:
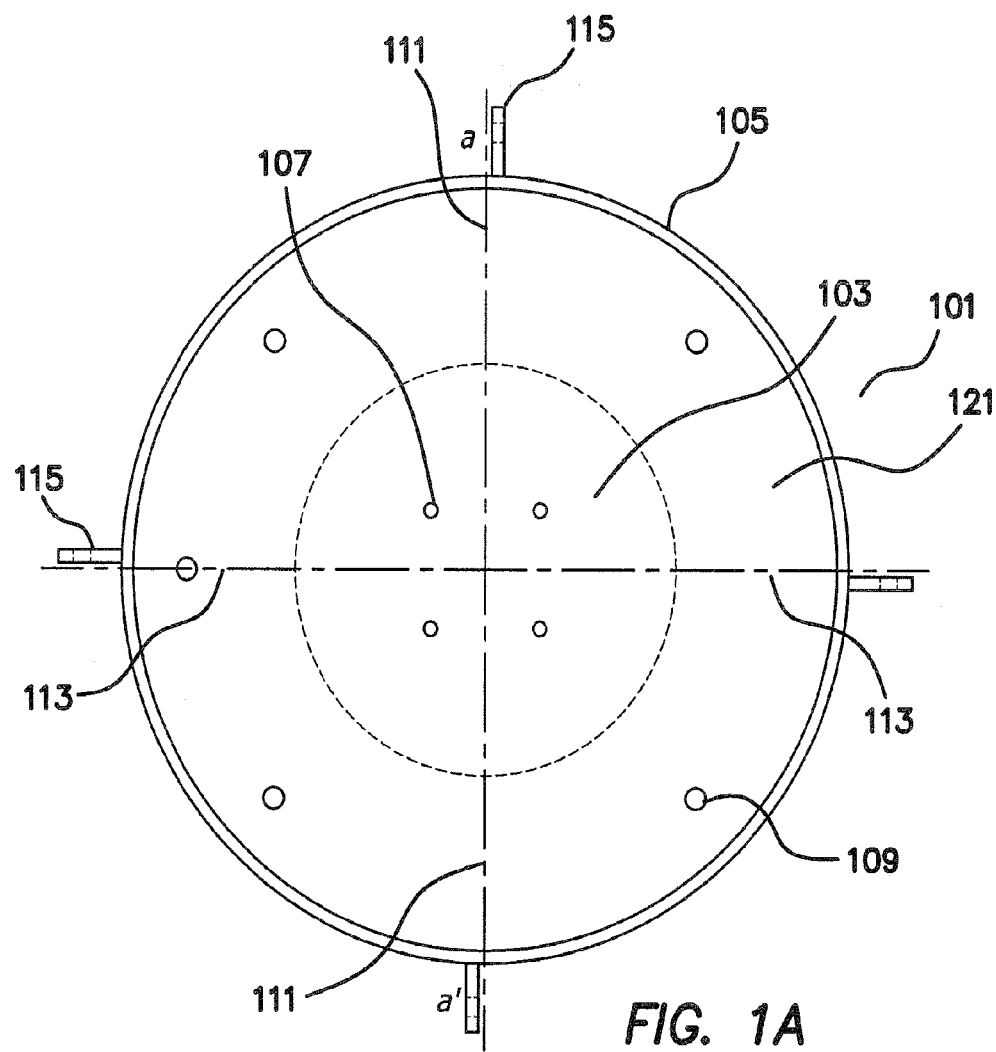
FIG. 1A is a top view of an inverted isolation bearing assembly, showing the load-bearing surface underneath in dotted lines.

FIG. 1A depicts a view of a modular isolation bearing half (101) of the present invention, from the side opposing the load-bearing surface, and showing the features of the load-bearing surface underneath in a transparent dotted line. With respect to the load-bearing surface, the substantially circular central area is depicted at (103). This substantially circular central area preferably has a curved surface; in one preferred embodiment the central, spherically curved region has a radius of curvature of about 86 inches, meaning it corresponds to an arc of a circle having a radius of about 86 inches. The radius of the load-bearing surface itself is about 32 inches. However, the radius of the central, spherically curved region (103) will change as necessary when employing a different bearing have admitted having a different load bearing surface radius.

Still with reference to FIG. 1A, in a line segment extending from point a to point a', the ratio of the diameter of the central region 101 to the remainder of the load-bearing surface (the annular region 121), is about 1.2 to 1. Thus, in a preferred embodiment where the dish is between about 8 inches to about 48 inches in total diameter, a dish having this ratio has a central region diameter of about 4.4 inches to about 26.2 inches, with the annular region (which is passed through twice by the line segment) having a width of about 1.8 to about 10.9 inches.

The annular region of the load-bearing surface is depicted in the area surrounding the substantially circular central area (121). This ring comprises, in the depicted preferred embodiment, a substantially conical region of the load-bearing surface, with a linear slope: the radial length of this conical region is approximately 5.2 inches, and it rises towards the circumference along line a-a' about 1 inch with a constant slope equaling about 1/5.2 or about 0.19. Preferably, the central region 101 does not comprise a central dimple for the rigid ball to rest within when the bearing is not subject to shear forces. However, in other embodiments the load-surface may contain a central dimple for the rigid ball to rest within when each of the plurality of isolation bearings is at rest. The dimple, if present, may be made as shallow as practicable to diminish the risk of dissonance during a seismic tremor.

Those of ordinary skill in the art will immediately recognize based on the foregoing, that the embodiment described above is only one of various possible embodiments of rolling ball load-bearing surfaces that may be used in the present invention. For example, the exact curvature of the central, spherically curved region 101 may be varied (for example, to a parabolic shape) without departing from the spirit of the invention. Additionally, the exact dimensions of the examples given here may be varied and will correspond to these examples in the event that the ratios and proportions are maintained substantially within the ranges given here. Thus, in other embodiments the load-bearing surface of each bearing half may comprise a spherical shape, a conical shape, or any combination of curved and linear shapes.

Figure 1B:
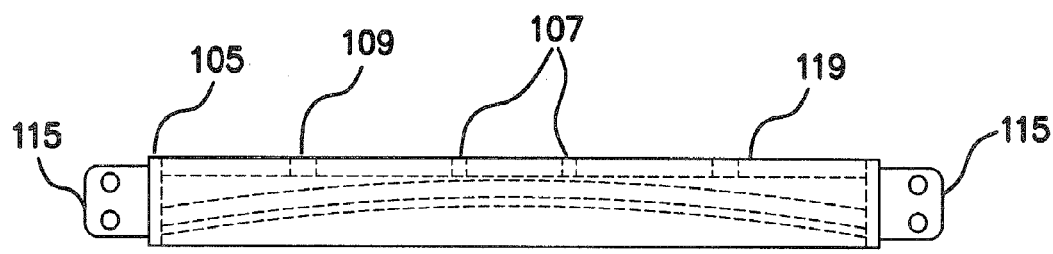
FIG. 1B is a side view of the inverted isolation bearing assembly of FIG. 1A.

FIG. 1A also shows the circumferential ring surrounding the bearing (105); this feature is also shown in FIG. 1B, which depicts the isolation bearing "upside down", with the bottom plate (119); with the bottom plate of the bearing casing at the top of FIG. 1B (119). A series of small holes (107), preferably tapped and threaded, is used for attaching the ends of girder elements to the bearing casing; FIG. 1A depicts four such small holes, with one hole being provided for each of the possible angles (0°, 90°, 180°, 270°) at which the bearing is designed to make connections. Of course, different angles and numbers of such holes may be made to suit the specific floor plan for which the modular isolation system of the present invention is designed to fit.

Line (111) shows a "North-South" central axis of the isolation bearing; line (113) shows in the "East-West" central axis of the bearing. Joining means, comprising tabs (115) welded to the circumferential ring (105), are shown slightly offset in a clockwise position from each of these central axes. The amount of the offset preferably approximates the sum of half the width of the tab (115) plus half the width of the girder element to which the tab will be connected. (See FIGS. 2A and 2B). FIG. 1B shows tabs (115) in side view; each tab in this embodiment has two holes drilled for connection to the girder element, preferably via suitably strong nuts and bolts. Larger holes (109) drilled (and also preferably tapped and threaded) into the bottom plate of the bearing casing are provided for attachment of a cover plate to the top surface of the modular isolation system, when the bearing half is an upper bearing half, (see, e.g., FIG. 6A) and optional attachment to leveling screws if the bearing half is a lower bearing half. (See, e.g., FIG. 3B).

FIG. 2A, FIG. 2B and FIG. 2C depict a girder element assembly; FIG. 2A shows the assembly in a top view, while FIG. 2B shows the same assembly in a side view, and FIG. 2C shows the assembly in an end view. The girder element (203) comprises an I-beam (FIG. 2C) in which a strip of steel plate (205) having a flat, eccentric tab at either end (207) is welded to the top surface of the I-beam. The eccentric tab has a reinforced hole (211) for attachment via a screw to the small, preferably tapped, holes (107) on the bottom plate of the bearing casing (119). At each end of the girder element, holes (209) are arranged in vertical alignment to prevent rotation of the assembled frame with respect to the bearing during use, and for connection to tab (115), projecting from a side of the bearing casing; these connections are made using nuts and bolts. Two tabs (213) are welded on either side of a central cross-sectional axis of the girder element to project at right angles to the longitudinal axis of the girder element; the amount of the offset from this central axis it is approximately equal to half the width of the frame element with which it will be joined. As shown in FIG. 2C, each tab (213) contains screw holes (215) arranged in vertical alignment for connection to other frame elements; preferably joist elements or other girder elements. Optionally, a reinforcing strip of steel bar (217) is welded to the top of the steel plate strip (205) along its entire length; this reinforcing steel bar strip (217) also serves the function of providing a border for flooring or platform tiles or other top surface elements of the isolation system. However, in other embodiments this reinforcing steel strip may be absent (See FIG. 7B).

Figure 3A:
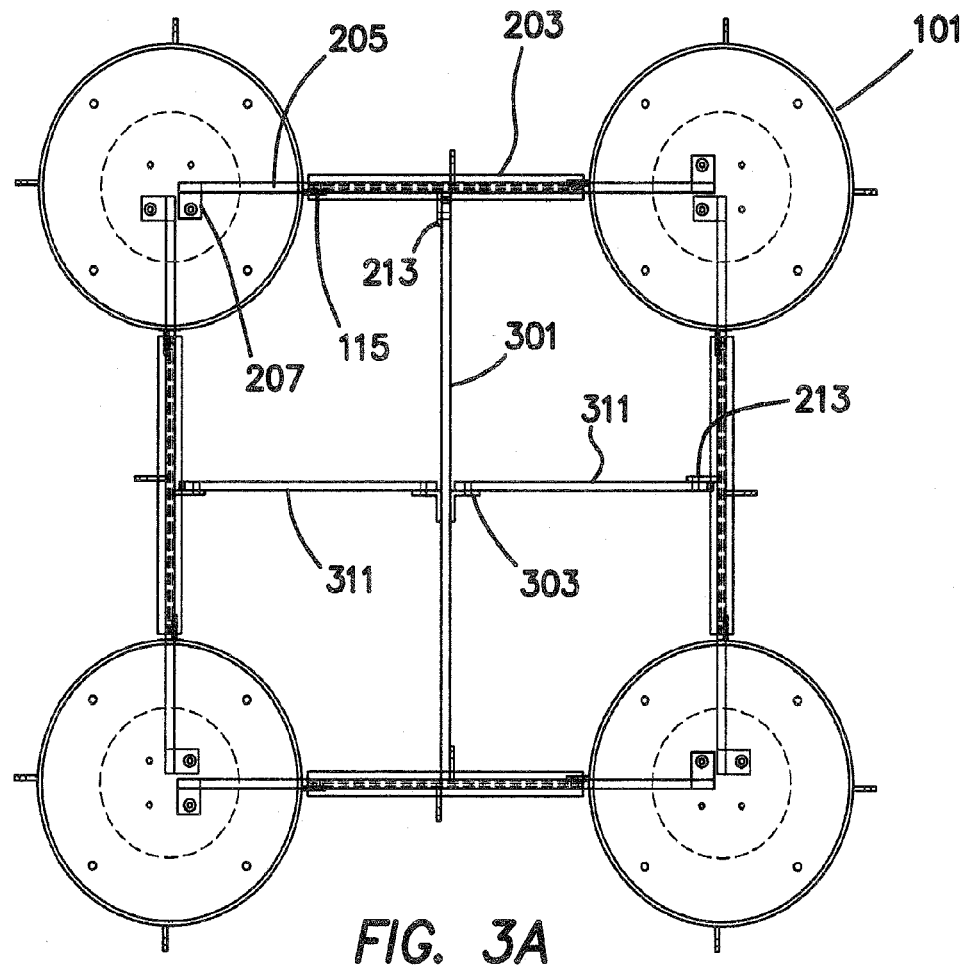
FIG. 3A is a top view of a preferred unit assembly made using modular elements of the present invention.
Figure 3B:
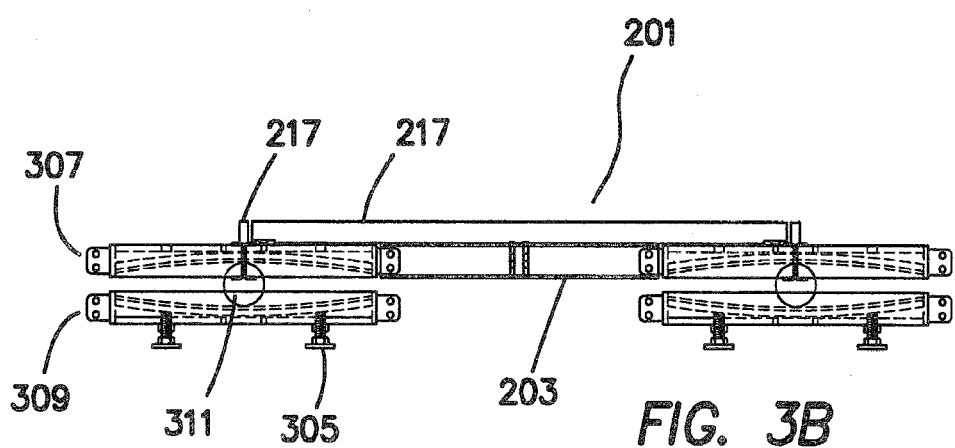
FIG. 3B is a side view of the preferred unit assembly of FIG. 3A.

FIGS. 3A and 3B show one configuration of the unit assembly may be using the modular elements of the modular isolation system of the present invention. In this configuration, tabs (115) are arranged at 90° angles around the circumference of the bearing casing. As a result, the resulting unit assembly comprises a rectangular footprint. In FIG. 3A, the top frame assembly is shown; each bearing (one-to-one) is connected to two girder element assemblies at positions corresponding to tabs 115 that are proximal to each other on the bearing circumferential ring. As shown in FIG. 3B, each girder assembly (201) is bolted to the tabs of two bearings, and the steel plate strip (205) of the girder element assembly is fastened to holes (107) of the bottom plate (119) of each bearing casing.

Joist elements are used to form an interior framework supporting and reinforcing the rectangular spacing of the girder elements (201) and bearing elements (101). The joist elements (301, 311), as depicted in FIG. 3A, are joined to tabs (213) projecting from each girder element. A single first joist element (301) spans the entire distance between, and is joined to two parallel girder elements. Second joist elements (311) each having a length slightly less than half that of the first joist element (301) are joined to tabs (213) of the other two parallel girder elements, and to bracket (303), welded or bolted to the side of the first joist element (301).

It will be apparent that if the weight of the payload requires it, the "unit assembly" shown in FIG. 3A may be modified through the use of shorter (but otherwise substantially similar) girder assembly elements (rather that a joist framework) to provide a fifth bearing element at the center of the unit assembly shown in this figure, thus providing a even more robust support for the payload.

FIG. 3B shows both top and bottom features of an assembled unit assembly such as that shown in FIG. 3A. In this figure bottom bearing assembly (309) is not linked to other bearings via framework; rather, the lower bearing assembly (309) is supported by the floor or foundation, and is leveled using leveling screws (305). In this view, upper bearing assemblies (307) are linked via girder assembly (201). In FIG. 3B it can be seen that the girder assembly (201) clearly contains reinforcing steel bar strip (217), which can be seen both in side and end view. Upper and lower bearing assemblies are separated, and the upper bearing assembly (and payload, if any) supported, by spherical steel ball (311).

Figure 4:
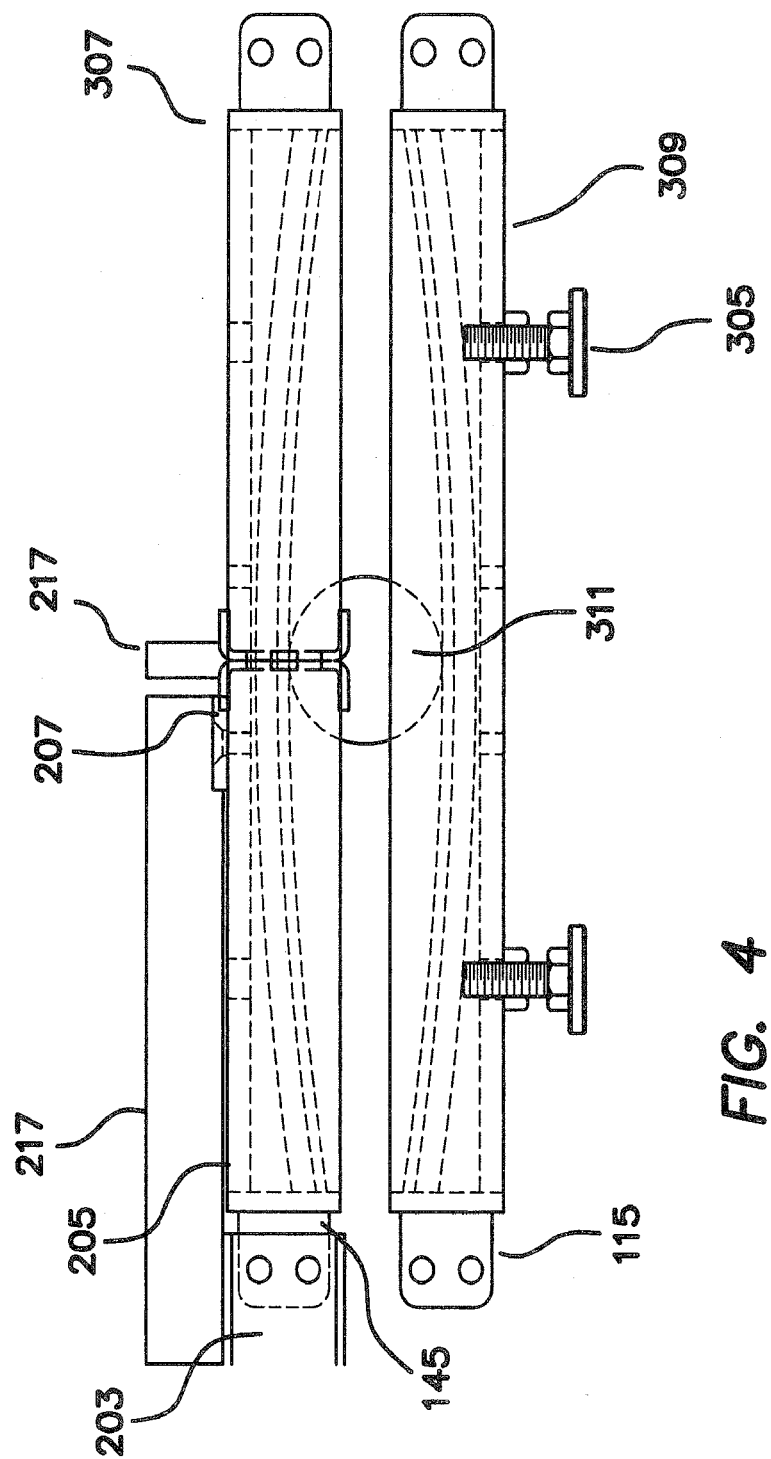
FIG. 4 is a magnified view of a bearing assembly of FIG. 3B.

FIG. 4 shows a close-up of the right-hand portion of FIG. 3B.

It will be clear from an examination of these figures and the disclosure of this specification that the "unit assembly" shown in FIG. 3A is extendable in any direction by use of the tabs (115) located on the bearing casings, and tabs (213) located on the girder assemblies.

Figure 5:
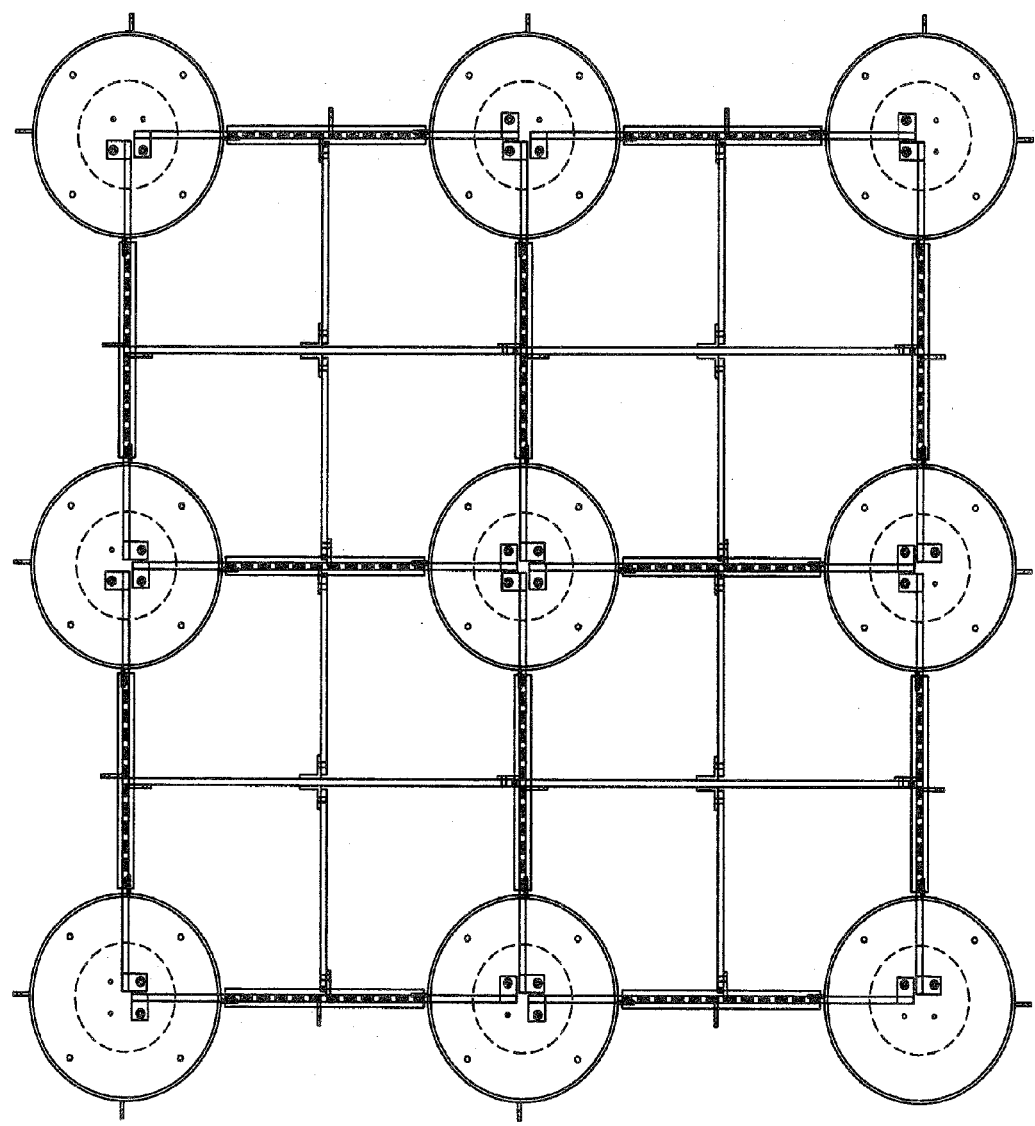
FIG. 5 is an expanded isolation system built up from the unit assembly of FIG. 3A.

FIG. 5 shows one such expanded isolation system, in which four unit assemblies (sharing borders and comprising nine bearing assemblies, 12 girder assemblies, 4 first joist assemblies and 8 second joist elements) are formed.

Those skilled in the art immediately understand that the combination of bearing elements having tabs (115) located at different, or additional locations, around the circumferential ring (105) of the bearing casing may provide additional design flexibility for modular isolation bearing systems. For example, one may combine bearings having tabs (115) located at 90° intervals with other bearings having tabs located at, for example, 45° intervals around the circumference of the bearing casing to provide the possibility of complex footprint shapes. Alternatively, the use of bearings having intervals located, for example, 120° from each other around the circumference of the bearing casing would give rise to triangular frame footprints. Additionally, bearing elements containing both 90°- and 120°-interval tabs may provide one type of very useful and flexible "universal" bearing element which could be used for either rectangular or triangular-shaped footprints, or portions thereof.

Figure 6A:
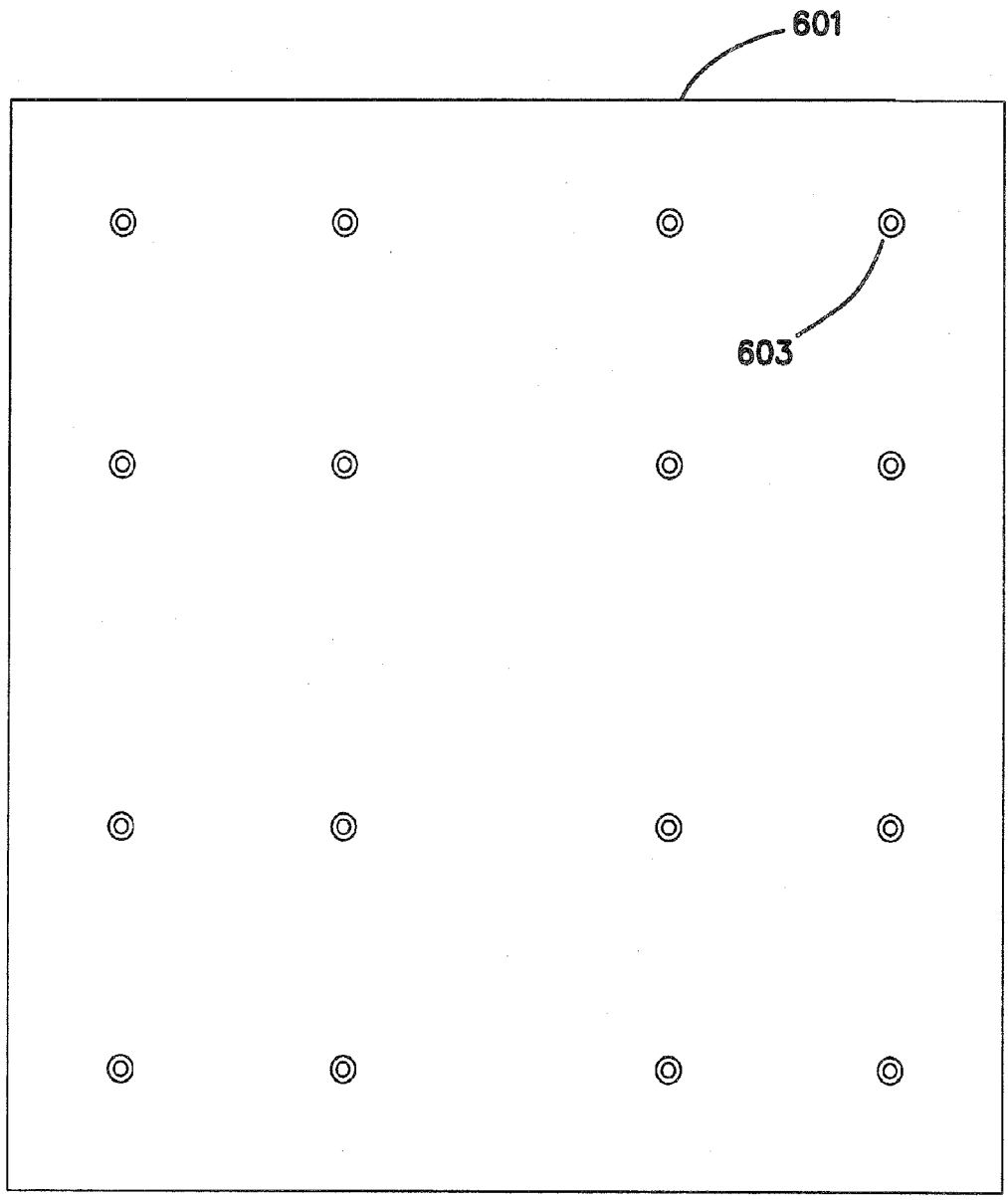
FIG. 6A is a top view of a sheet component of an alternative embodiment of the isolation system of the present invention.
Figure 6B:
FIG. 6B is a side view of the sheet component of FIG. 6A.

FIG. 6A shows a plate which can be optionally used in another embodiment of the modular isolation system of the present invention. The plate (601), which is preferably made of steel or another sturdy, preferably metallic material, comprises a series of holes (603) corresponding to preferably threaded holes (109) on the bottom plate (119) of the bearing element casing (the "bottom" plate being the "top" plate of the upper bearing assembly). Plate (601) is thus joined to each of the 4 bearing elements comprising a unit assembly such as the one depicted in FIG. 3A; wherein plate (601) is preferably joined by each of holes 109 and 603 of each bearing assembly. FIG. 6B shows a cross-section of plate (601).

Figure 7A:
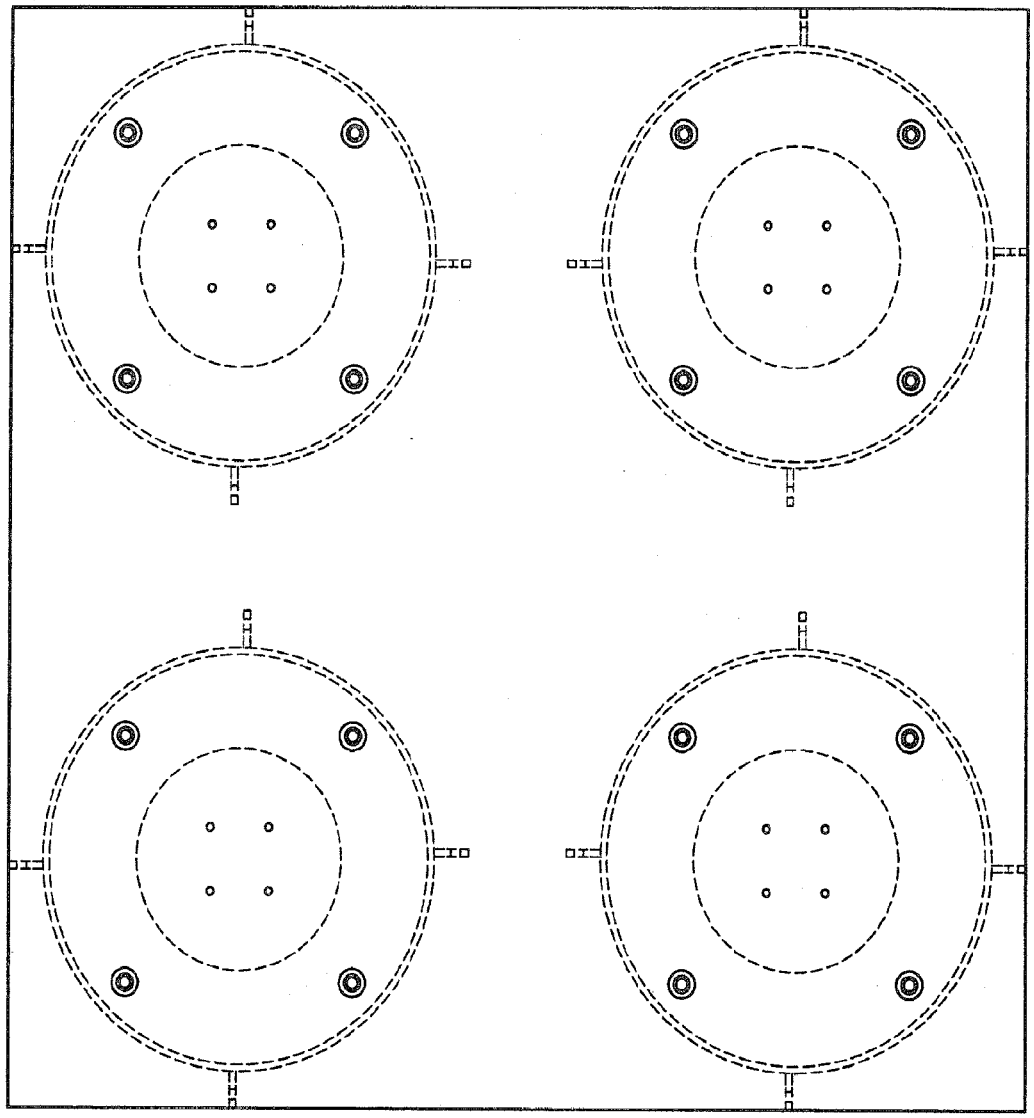
FIG. 7 is a top view of a isolation system unit assembly made using modular elements of the present invention, including the sheet component of FIG. 6A.
FIG. 7B is a side view of the isolation system unit assembly of FIG. 7A.
Figure 7B:
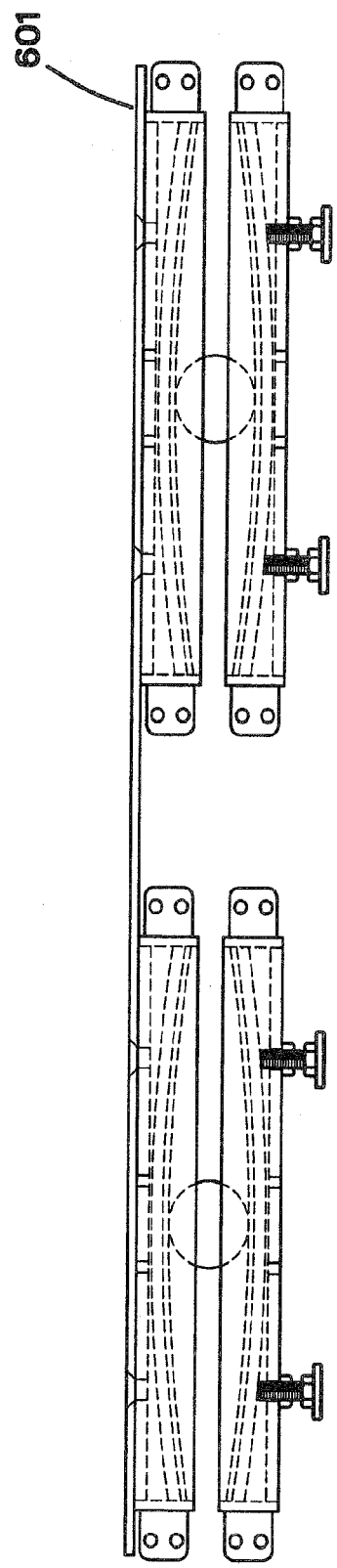

FIG. 7A shows a top view, with dotted lines depicting features lying underneath late 601, of the assembly comprising the plate. FIG. 7B is a side view of the isolation system, in which plate 601 is attached to the top of each of the upper bearing elements. Note that in this embodiment no upper frame is necessary, and no lower frame is present, in the isolation system. Thus, in this embodiment, frame elements such as the girder elements and the joist elements shown in e.g. FIG. 2A, FIG. 2B and FIG. 3A are not present. However, if the user so desires, frame elements may also be present in the upper and/or lower isolation system assemblies; such additional reinforcement may be suitable for particularly heavy payloads, or in particularly active seismic locations. In such a case, upper girder elements may lack steel bar strip (217).

Although the foregoing invention has been exemplified and otherwise described in detail for purposes of clarity of understanding, it will be obvious that modifications, substitutions, and rearrangements to the explicit descriptions may be practiced within the scope of the appended claims. Additionally, features illustrated herein as being present in a particular embodiment are intended, in aspects of the present invention, to be combinable with features described or not, in a manner not otherwise illustrated in this patent application or present in that particular embodiment. All publications and patent documents cited herein are hereby incorporated by reference in their entirety for all purposes to the same extent as if each were so individually denoted.

We claim:

1. A kit for assembling a modular seismic isolation system which comprises a plurality of unit components, said plurality of unit components comprising:
  a) A plurality of isolation bearing assemblies having load-bearing surfaces that are substantially identical in cross-section, each such isolation bearing assembly comprising:
    i) a symmetrical recessed load-bearing surface, comprising a spherically curved central region and an annular region having a constant slope, wherein the ratio of the diameters of the central region to the annular region is about 1.2 to 1, joined to and contained within
    ii) a bearing casing comprising
      A) a circumferential or parametric ring surrounding and projecting above the edge of the load-bearing surface, and
      B) a plate backing joined to the circumferential or parametric ring;
  wherein each said bearing casing comprises means for directly or indirectly joining each such casing to a plurality of other bearing casings;
  b) a plurality of frame elements comprising a plurality of girder element assemblies, said girder element assembly comprising
    i) a girder element having a length and a first and second end, said girder element comprising means proximal to each said first and second end for joining said girder element assembly to a bearing assembly, and
  c) a plurality of hardened spherical balls.

2. The kit of claim 1 wherein said plurality of frame elements also comprises a plurality of joist elements comprising means for securely joining the joist elements to the girder element assemblies, thereby forming a rigid frame element.

3. The kit of claim 1 wherein each such bearing casing comprises each said bearing casing comprises at least two means for directly or indirectly joining each such bearing casing to a plurality of other bearing casings.

4. The kit of claim 1 wherein at least one said means for joining said bearing casing to a plurality of other bearing casings comprises a plurality of metallic tabs welded to the bearing casing, said tabs thereby structured to connect bearing assemblies together by bolting or screwing tabs of more than one bearing assembly to a common girder element assembly.

5. The kit of claim 1 wherein at least one said means for joining said bearing element to a plurality of other bearing casings comprises a plurality of tapped holes in the bearing casing, said tapped holes thereby structured to connect bearing assemblies together by bolting or screwing more than one bearing assembly to a common girder element assembly.

6. An isolation bearing system comprising:
a) a plurality of isolation bearing assemblies having load-bearing surfaces that are substantially identical in cross-section, each such isolation bearing assembly comprising:
   i) a symmetrical recessed load-bearing surface, comprising a spherically curved central region and an annular region having a constant slope wherein the ratio of the diameters of the central region to the annular region is about 1.2 to 1, joined to and contained within
   ii) a bearing casing comprising
      C) a circumferential or parametric ring surrounding and projecting above the edge of the load-bearing surface, and
      D) a plate backing joined to the circumferential or parametric ring;
wherein each said bearing casing comprises means for directly or indirectly joining each such bearing casing to a plurality of other bearing casings;
b) a plurality of frame elements comprising a plurality of girder element assemblies, said girder element assembly comprising
   i) a girder element having a length and a first and second end, said girder element comprising means proximal to each said first and second end for joining said girder element assembly to a bearing assembly, and
c) a plurality of hardened spherical balls,
wherein a first half of each bearing assembly of said plurality of bearing assemblies is joined, with the load-bearing surfaces facing downward, to at least one other bearing assembly by a common girder assembly, thereby defining an upper isolation bearing frame assembly; and
   wherein a second half of each bearing assembly of the plurality of bearing assemblies are supported on a substantially horizontal foundation, facing upward, directly opposing the downward facing recessed lead bearing surface of each of a plurality of upper isolation bearing assemblies, thereby defining a lower isolation system assembly, each said opposed upper and lower recessed surfaces thereby defining a cavity, wherein at least one hardened spherical ball having a diameter greater than the combined depth of the upper and lower recesses is located within each said cavity.

7. The system of claim 6 wherein said plurality of frame elements also comprises a plurality of joist elements comprising means for securely joining the joist elements to the girder element assemblies, thereby forming a rigid upper frame element.

8. The system of claim 6 wherein each such bearing casing comprises each said bearing casing comprises at least two means for directly or indirectly joining each such bearing element to a plurality of other bearing casings.

9. The system of claim 6 wherein at least one said means for joining said bearing casing to a plurality of other bearing casings comprises a plurality of metallic tab welded to the bearing casing, said tabs thereby structured to connect bearing assemblies together by bolting or screwing tabs of more than one bearing assembly to a common girder element assembly.

10. The system of claim 6 wherein at least one said means for joining said bearing casing to a plurality of other bearing casings comprises a plurality of tapped holes in the bearing casing, said tapped holes thereby structured to connect bearing assemblies together by bolting or screwing more than one bearing assembly to a common girder element assembly.

11. The system of claim 6 wherein at least one means for joining said bearing casing to a plurality of other bearing casings comprises a steel plate strip welded to the girder element and comprising a flattened tab proximal to each end, each said tab comprising at least one hole, and wherein each said tab is joined to a different bearing casing by screwing said tab through said hole to a tapped hole in the bearing casing.

12. The system of claim 6 wherein the bearing assemblies of said lower isolation system assembly are joined together by frame elements.

13. A kit for assembling a modular seismic isolation system comprising:
c) A plurality of isolation bearing assemblies having load-bearing surfaces that are substantially identical in cross-section, each such isolation bearing assembly comprising:
   iii) a symmetrical recessed load-bearing surface, comprising a spherically curved central region and an annular region having a constant slope wherein the ratio of the diameters of the central region to the annular region is about 1.2 to 1, joined to and contained within
   iii) a bearing casing comprising
      E) a circumferential or parametric ring surrounding and projecting above the edge of the load-bearing surface, and
      F) a plate backing joined to the circumferential or parametric ring;
wherein each said bearing casing comprises means for directly or indirectly joining each such bearing element to a plurality of other bearing casings;
d) a metallic sheet comprising means for joining a plurality of said bearing assemblies together and to said sheet, and
e) a plurality of uncoated, low friction hardened spherical balls.

14. An isolation bearing system comprising:
e) a plurality of isolation bearing assemblies having load-bearing surfaces that are substantially identical in cross-section, each such isolation bearing assembly comprising:
   j) a symmetrical recessed load-bearing surface, comprising a spherically curved central region and an annular region having a constant slope wherein the ratio of the diameters of the central region to the annular region is about 1.2 to 1, joined to and contained within
   iv) a bearing casing comprising
      G) a circumferential or parametric ring surrounding and projecting above the edge of the load-bearing surface, and
      H) a bottom plate joined to the circumferential or parametric ring;
wherein each said bearing casing comprises means for directly or indirectly joining each such bearing element to a plurality of other bearing casings;
a) a metallic plate sheet having an area sufficiently large to substantially cover the top of a plurality of said isolation bearing assemblies and having means for joining the plate to the bearing casing of said plurality of bearing assemblies c) a plurality of uncoated, low friction hardened spherical balls, wherein each bearing assembly of said plurality of bearing assemblies is joined, with the load-bearing surfaces facing downward, to at least one other bearing assembly by said metallic plate sheet, thus forming an upper isolation bearing frame assembly; and wherein a each bearing assembly of said plurality of bearing assemblies are supported on a substantially horizontal foundation, facing upward, directly opposing the downward facing recessed lead bearing surface of each of a plurality of upper isolation bearing assembly, thereby defining a lower isolation system assembly, each said opposed upper and lower recessed surfaces thereby defining a cavity, and wherein at least one hardened spherical ball having a diameter greater than the combined depth of the upper and lower recesses is located within each said cavity.

* * * * *